C. G. HANNA.
POWER GEAR SHIFTING MECHANISM.
APPLICATION FILED MAY 15, 1914. RENEWED JUNE 27, 1916.
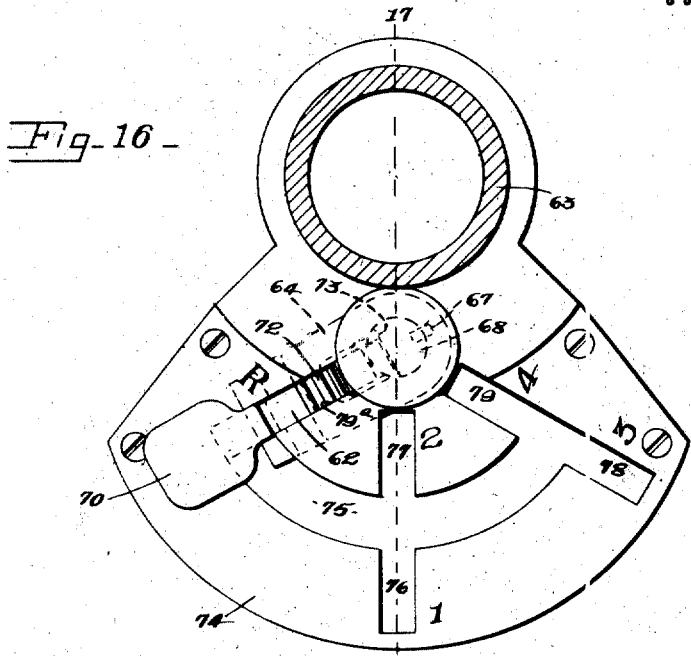
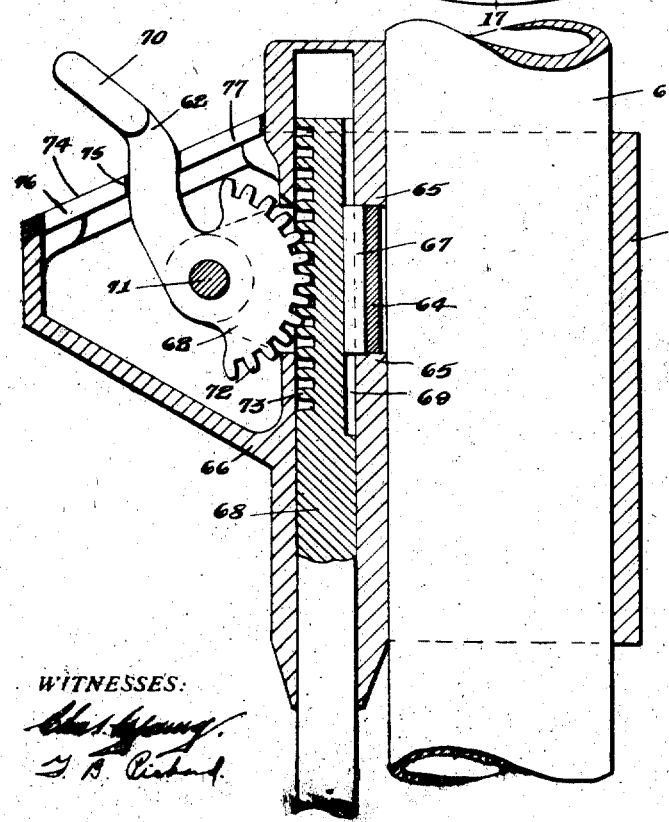

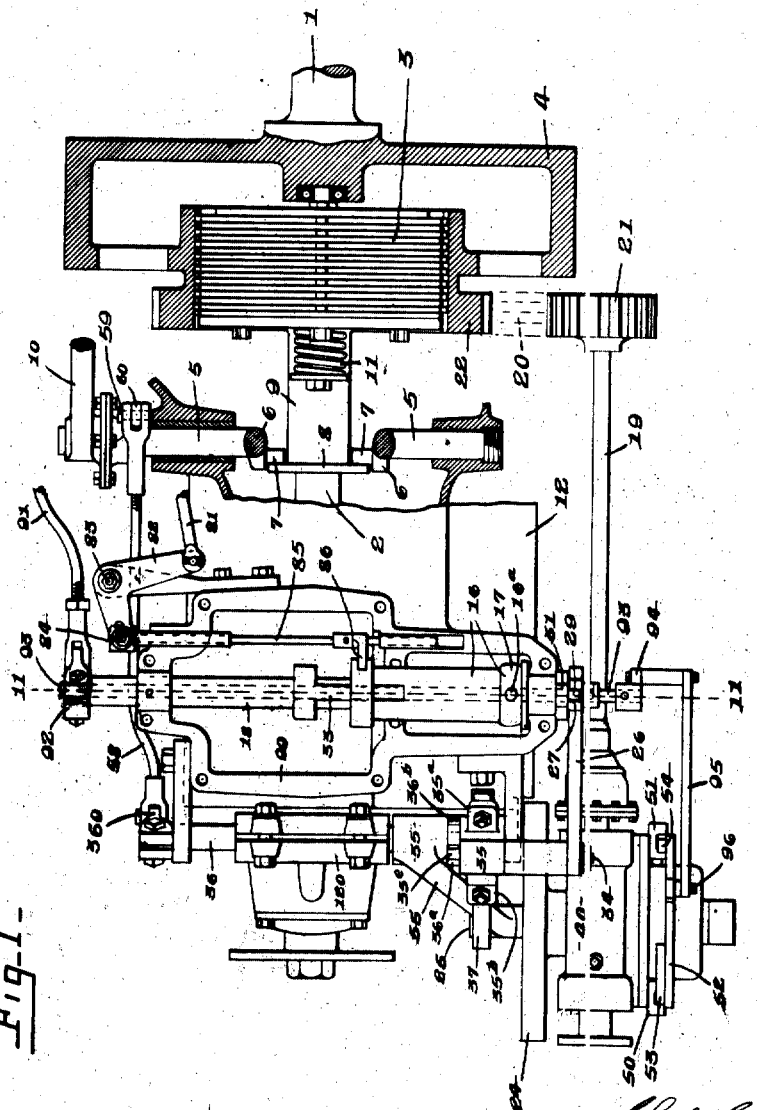

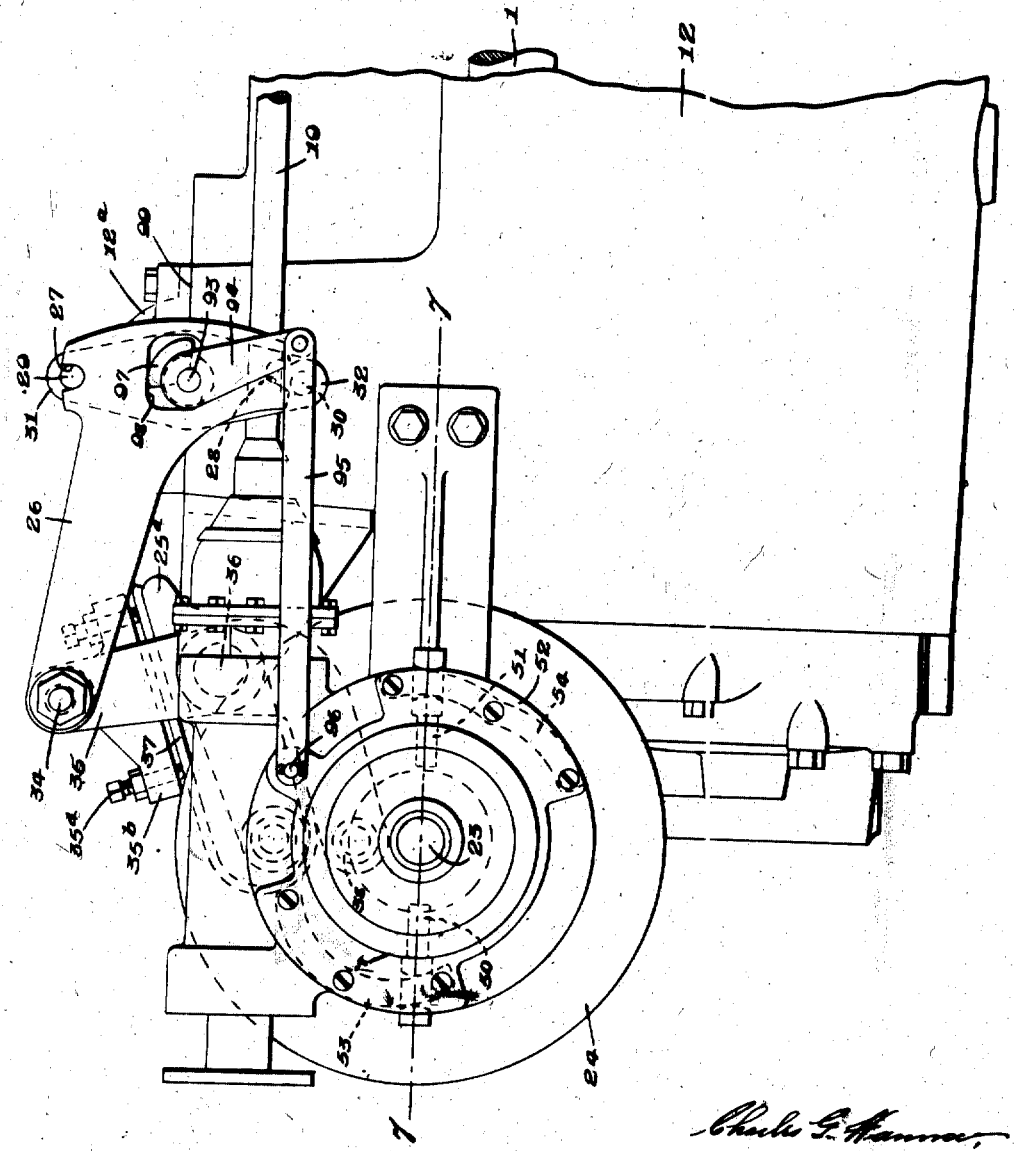

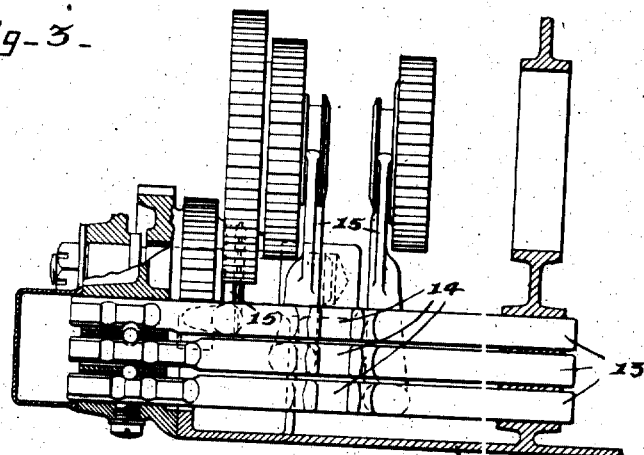
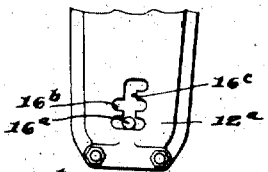
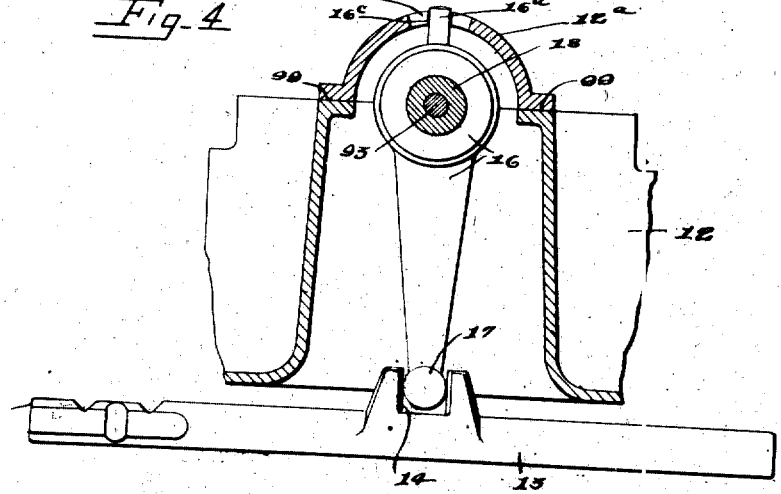

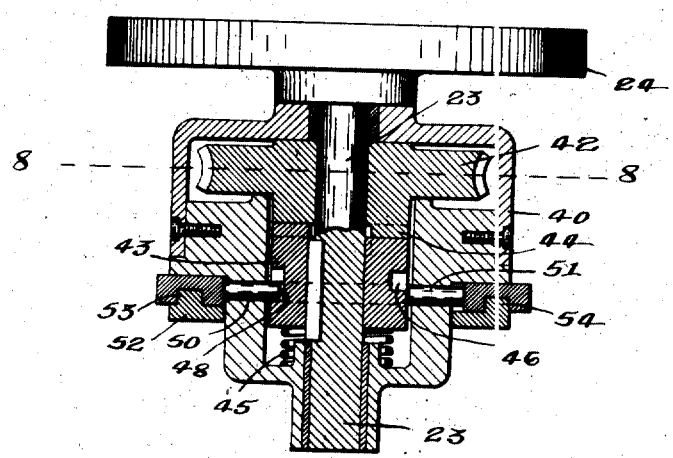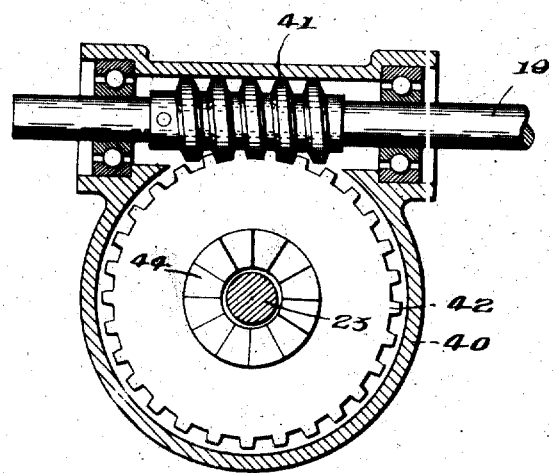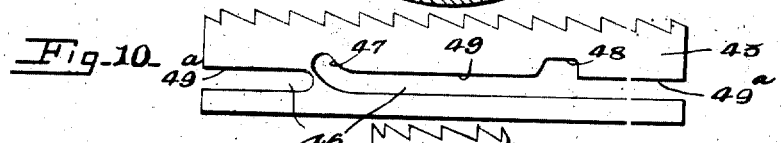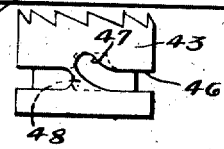

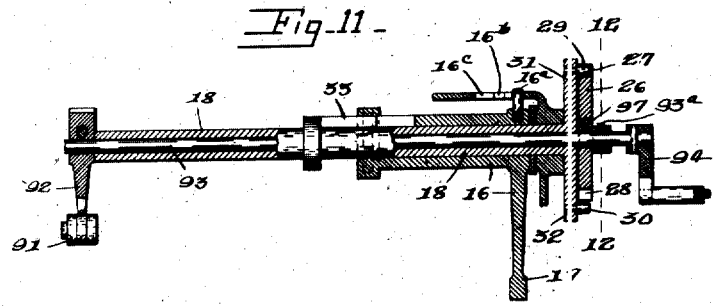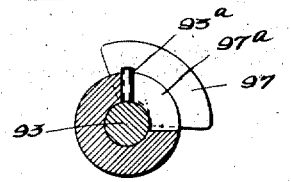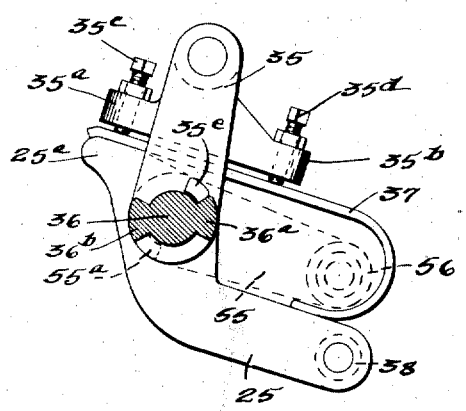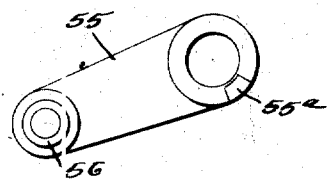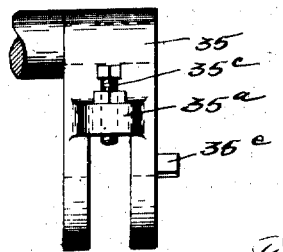

C. G. HANNA.
POWER GEAR SHIFTING MECHANISM.
APPLICATION FILED MAY 15, 1914. RENEWED JUNE 27, 1916.

1,221,319.  Patented Apr. 3, 1917.

WITNESSES:

Charles G. Hanna,
INVENTOR
BY
ATTORNEYS

UNITED STATES PATENT OFFICE.

CHARLES G. HANNA, OF SYRACUSE, NEW YORK, ASSIGNOR OF ONE-HALF TO ADELBERT SLOCUM, OF SYRACUSE, NEW YORK.

POWER GEAR-SHIFTING MECHANISM.

1,221,319.   Specification of Letters Patent.   Patented Apr. 3, 1917.

Application filed May 15, 1914, Serial No. 838,701. Renewed June 27, 1916. Serial No. 106,262.

*To all whom it may concern:*

Be it known that I, CHARLES G. HANNA, a citizen of the United States, and a resident of Syracuse, in the county of Onondaga and State of New York, have invented a certain new and useful Power Gear-Shifting Mechanism, of which the following is a specification.

This invention relates to change speed transmission gearing for motor vehicles, and has for its object means whereby different speed changes, effected by shifting elements, as clutches or gears, are accomplished by power taken from the engine, and controlled by manual means; and the invention consists in the novel combinations and constructions hereinafter set forth and claimed.

In describing this invention, reference is had to the accompanying drawings, in which like characters designate corresponding parts in all the views.

Figure 1 is a plan, partly in section, of a gearing provided with my invention, contiguous portions of the motor shaft and fly wheel, and clutch connecting the same and the gearing being also shown.

Fig. 2 is an elevation of parts seen in Fig. 1, the fly wheel and main clutch being omitted.

Fig. 3 is a detail view illustrating in plan the shifters or shipper rods with which the selecting and shifting member coact, and contiguous parts.

Fig. 4 is a side elevation of one of the shipper rods, the selecting and shifting member being shown as coacting therewith.

Fig. 4ª is a plan view of the cover plate showing the slot therein.

Figure 5:
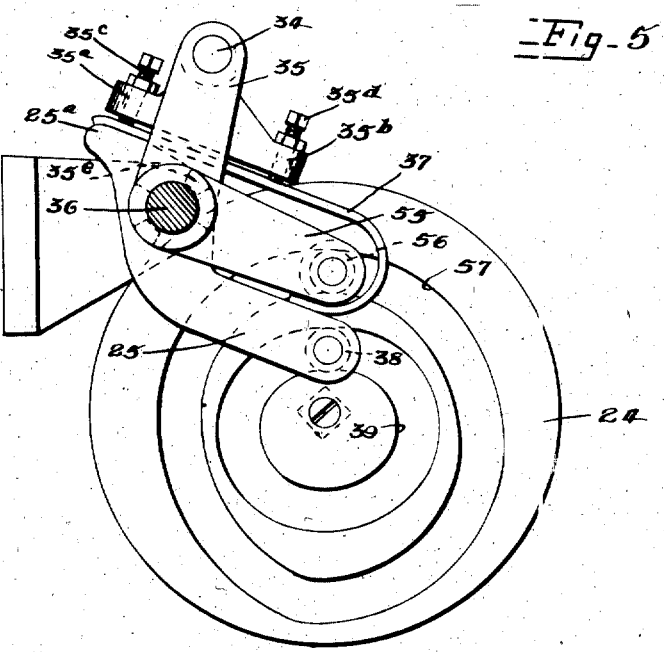

Fig. 5 is a face view of the cam forming part of the power transmitting mechanism which effects the gear shifts and controls the operation of the main clutch during the gear shifts, the parts of said mechanism coacting with the cam being also shown.

Figure 6:
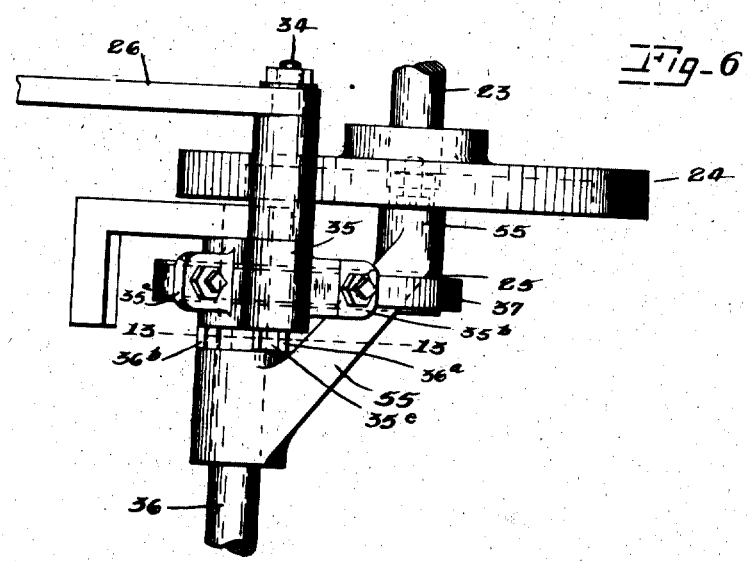

Fig. 6 is a plan view of parts seen in Fig. 5.

Fig. 7 is a sectional view taken on the plane of line 7—7, Fig. 2, showing the clutch or connecting means between the power shaft and the power transmitting mechanism, which effects the gear shifts, and the means for operating the clutch or connecting means.

Fig. 8 is a sectional view on line 8—8, Fig. 7.

Fig. 9 is a detail view of the connecting means or clutch section.

Fig. 10 is a developed view of the periphery of the clutch section.

Fig. 11 is a detail view through the shifting member and contiguous parts, taken on the plane of line 11—11, Fig. 1.

Fig. 12 is a detail of the cam for shifting the reversing member, Fig. 12 being taken on plane of line 12—12, Fig. 11.

Fig. 13 is a sectional view, parts being omitted, on line 13—13, Fig. 6.

Fig. 14 is an edge view of one of the levers shown in Fig. 13 looking to the left.

Fig. 15 is a side elevation of another of the levers shown in Fig. 13.

Fig. 16 is a plan view of the manually operated controlling lever and controlling parts, the steering wheel post being shown in section.

Fig. 17 is a section on the plane of line 17—17, Fig. 16, the lever being shown as shifted into its central position.

Figure 18:
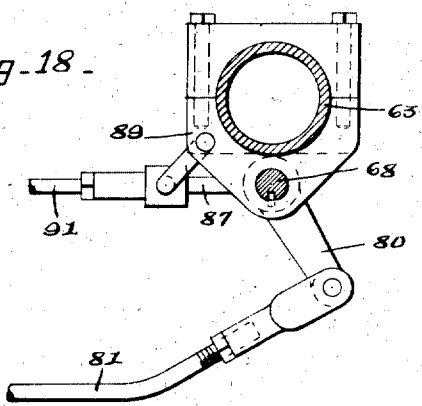
Figure 19:
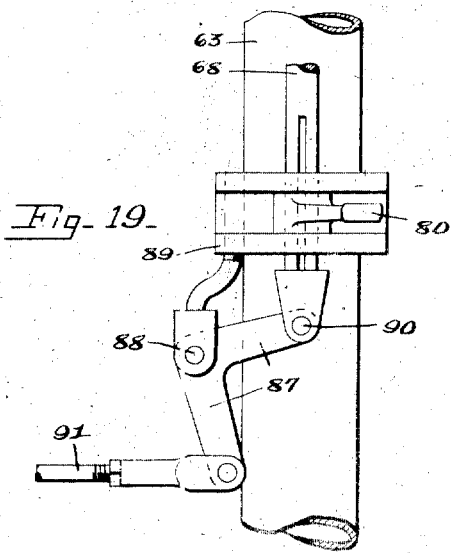

Figs. 18 and 19 are, respectively, a cross-section and an elevation through the steering wheel post showing the means for transmitting the motion of the manually operated controlling element to the parts associated with the gearing.

Figures 20, 21:
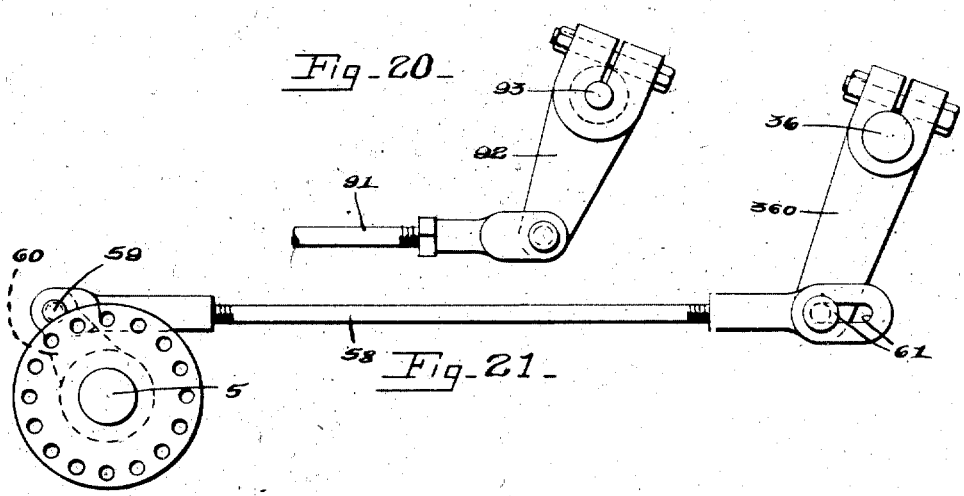

Fig. 20 is a detail view of the connections between the link shown in Fig. 19 and the rock shaft associated with the transmission gearing for controlling the gear shifts.

Fig. 21 is a detail view of the power transmitting connections between the power driven, gear-shifting mechanism and the main clutch operating mechanism.

This change speed gearing includes, generally, a shifting member, a power shaft, power transmitting connections between the power shaft and the shifting member including shiftable connecting means as a shiftable element or clutch normally out of effective connection with the power shaft, manually operated means for controlling the shifting of said connecting means or clutch into and out of effective connection with the power shaft, and means operated by the manual means for automatically shifting the connecting means or clutch out of operative position when the operation of the shifting member has been accomplished.

The invention further preferably includes means whereby the gear shifting operation can take place only when the main clutch is disengaged so that the transmission gearing is not being driven by the engine shaft when the changes or shifts are made.

The common type of transmission gearing now used in motor vehicles is what is known as the selective type, and I have shown my invention as embodied in this type of gearing, and the manually operated controlling means also effects the selecting movement of the shifting member. This shifting member, in selective type of gearing, usually consists of an axially movable rock shaft having a finger or arm projecting therefrom which coacts with notches in shifters which are usually called shipper rods, the axial movement of the shifting member moving the finger out of the notch of one shipper rod and into the notch of another, thus selecting a particular shipper rod, and the rocking movement of said member in one direction or the other from neutral position effects the gear shifting operation. As will be understood by those skilled in the art, the shipper rods are connected by means of forks or otherwise to shiftable gears.

The construction of gearing *per se* forms no part of this invention, and I have illustrated only enough of the internal mechanism of the gearing to make my invention clear to those skilled in the art. In so far as this invention is concerned it is immaterial whether gears or clutches are shifted or whether the shifting member operates other speed controlling elements. The term selective or selective power transmission gearing is used generically throughout in the interest of brevity and is used in the sense that some part to be shifted is selected before being shifted rather than in a narrower sense such as the term might be said to have acquired to denote what is now known to the automobile trade as a specific form of selective gearing.

In the form of my invention here illustrated, means operated by the engine is provided whereby the main clutch is shifted out of operative position preliminary to the gear shifting operation and into operation after the shifting is completed, and said means is controlled by the manually operated mechanism governing the gear shift. Preferably, said means is actuated by the power transmitting mechanism which effects the gear shifts, or the power transmitting mechanism includes two branches, one operating the gear shifting member and the other, the main clutch operating means, both branches being controlled by the shiftable connecting or clutch means which is common to both branches.

1 is the driving or motor shaft, 2 the driven shaft. 3 designates the main or disk clutch connecting the shafts 1, 2, the clutch being shown as built into the fly wheel 4 of the engine.

5 is a rock shaft having a yoke 6 provided with trunnions 7 acting on a collar 8 which is carried by a sleeve 9 slidable on the shaft 2, the sleeve 9 having a head which carries one of the sets of disks of the disk clutch 3, and the shaft 5 being operated by the usual pedal 10 to separate the disks of the clutch 3 against the action of springs, as 11, which normally serve to press the disks together.

12 is the casing of the transmission gearing, this casing being bolted to the engine casing in the usual manner, and the clutch operating shaft 5 being journaled in suitable bearings in the casing, and the driven shaft being journaled in said casing and forming the main shaft of the change speed gearing, as will be understood by those skilled in the art.

13 are the shifters or shipper rods having notches 14 therein which are alined when the gears are in neutral position, these rods having the usual forks 15 coacting with shiftable gear elements, it being understood that the direct drive is made through jaw clutches connecting the shaft 2 with the axially alined shaft of the gearing and that intermediate and reverse speeds are made through shiftable gears. The shifting of the clutch and gears is brought about by movements of the shipper rods 13.

The construction so far described is standard and forms in itself no part of this invention.

16 is the shifting member which has a selecting and shifting finger 17, Fig. 4, said member 16 being shiftable axially to carry the lower end of the finger into the notch 14 of any one of the shipper rods 13 and having a rocking movement in one direction or the other to shift the shipper rod selected.

In the ordinary construction of gearing, this member 16 is an axially shiftable rock shaft which is shifted axially and rocked manually. In this gearing, the shifting member is a sleeve mounted on a supporting shaft 18, Fig. 1, occupying the same position as the rock shaft of the old shifting member, the sleeve being slidable axially by a manually controlled lever and movable about its axis by power means driven from the engine, to be presently described. The shaft 18 is hollow for a purpose to be described.

The member 16 is rocked to effect the shifting movement by normally idle power transmitting mechanism which includes a shiftable connecting means or an element here shown as a clutch section shiftable into and out of effective connection with the power shaft of the engine and being normally out of effective connection therewith and shifted by manual means into effective connection. This power transmitting mechanism receives its power from the engine shaft through a constantly rotating power shaft 19 extending along the outside of the gear casing 12 and being here shown as connected to the shaft 1 by a belt or silent chain 20 running over wheels 21, 22 on the shaft 19 and on the disk clutch casing, which is formed integral with the fly wheel 4.

As the shifting member 16 or finger, (Fig. 4) is normally arranged in a neutral position and is movable about its axis in opposite directions from its neutral position to effect gear shifts, the power transmitting mechanism includes a motion reversing member which is controlled by the manual means effecting the selecting or axial movement of the member 16. More specifically, the power transmitting mechanism comprises a shaft 23, Figs. 2, 7 and 8, extending crosswise of the shaft 19 and connected thereto, as will be presently described, a cam 24, Figs. 5, 6 and 7, mounted on the inner end of said shaft, a lever 25 coacting with the cam, the motion reversing member 26 between the lever 25 and the member 16, and a clutch element, normally out of operative position and shiftable to connect the cam shaft 23 to the shaft 19. The reversing member 26 is an endwisely movable link which is shifted into and out of connection with the member 16 on opposite sides of the axis thereof, and is here shown as having notches or open ended slots 27, 28 on its upper and lower sides coacting with pins 29, 30 at the ends of arms 31, 32 extending in opposite directions from the shaft 18, Fig. 11, which shaft 18 is coupled to the member 16 as by a sliding key connection 33 to rock the member 16 in any axial position thereof. The reversing member 26 is shifted manually to engage either one or the other of the arms 31, 32, as will be hereinafter described.

The lever 25 is connected to the link 26 through a spring connection which acts when the intermeshing of the gears of the gearing is delayed owing to the fact that the ends of the gear teeth abut or clash, and as here shown, the reversing member or link 26 is pivoted at its rear end at 34, Figs. 1, 2, 5 and 6, to a lever 35 loosely mounted on a shaft 36 on which the lever 25 also is mounted, and the spring 37 is interposed between the levers 25, 35 so that when the lever 25 is actuated, the motion of the cam is transmitted to the lever 35 through the spring, and this spring will yield and store up the motion of the lever 25 in case the reversing member 26 is held from movement by the fact that the teeth of the gears clash. The lever 25 constitutes a driving member or part positively connected to the cam 24 and the lever 35 is a driven member or part positively connected to the shifting member 16.

The lever 25 is provided with a wiper 38 at its end which moves in a cam groove 39, Fig. 5, in the cam disk 24. The first half revolution of the cam shifts the selected gear into mesh with its companion gear, and the second half revolution shifts the gear back to neutral position. The cam shaft 23 is journaled in bearings in a suitable casing 40 supported by the casing 12 of the gearing, and the motion of the power shaft 19 is transmitted thereto through a worm 41 on the shaft 19 and a worm gear 42 loosely mounted on the shaft 23 within the casing 40 and normally ineffective shiftable connecting means, previously referred to. Said connecting means or clutch section 43 in this embodiment of my invention comprises a jaw clutch section 43 shiftable into and out of engagement with a clutch face 44 on the worm gear. The clutch section 43 is slidable on the shaft 23 into and out of engagement with the clutch face 44, and is pressed into operative position by a spring 45 interposed between the same and the opposing wall of the casing 40; and is controlled in its shifting movement by the manually operated means to be described.

As seen in Fig. 14, the lever 35 is bifurcated and is provided with front and rear brackets 35ª, 35ᵇ, Fig. 13, carrying set screws 35ᶜ and 35ᵈ, and the spring 37 is a loop of flat spring metal and one end extends between the bifurcations and between a short arm 25ª of the lever 25 and the front bracket 35ª and its set screw 35ᶜ. The portion of the spring between the lever 35 and the loop or curve of the spring, bears against the set screw 35ᵈ carried by the rear bracket. The starting position or angular relation of the lever 35 relatively to the shaft 36 is adjusted by the set screw 35ᶜ so that the slots 27, 28 of the reversing member 26 will coact at proper time with the pins 29, 30; and the tension of the spring 37 is adjusted by the set screw 35ᵈ. The lever 35 is also formed with a laterally extending lug or shoulder 35ᵃ for a purpose to be presently described.

As here shown, in Figs. 9 and 10, the clutch section 43 is formed with a cam in the form of a groove 46 having an inclined portion 47 and a blank portion 48 spaced apart, and a dwell portion 49 between the cam and blank, the inclined portion 47 and blank 48 being located diametrically opposite each other so that the dwell 49 extends about half way around the clutch section.

The cam groove is also formed with a dwell 49ª extending from the blank 48 and terminating near the cam 47. Hence, the groove extends nearly around the clutch section.

50 and 51 are pins spaced apart to enter the inclined portions 47 and blank 48 of this groove, one pin being normally in the cam portion 47 while the other is opposite the blank portion 48 but is withdrawn out of same, and means is provided for alternately operating said pins to move one pin out of the cam portion 47 and the other into the blank portion 48. Upon the withdrawal of one pin out of the portion 47 and the shifting of the other pin into the blank portion, the spring is free to shift the clutch section 43 into engagement with the clutch section 44 so that the shaft 23 is rotated, thus actuating the cam 24 and rocking the shifting member 16, and during the rotation of the clutch section 43, the pin 50 or 51, which has been shifted into the blank portion 48, passes into the dwell portion 49 and then into the cam portion 47 withdrawing the clutch section 44 out of engagement with the clutch 44 after the clutch section has made one-half revolution, and this pin remains in the cam portion 47 and holds the clutch section 44 in inoperative position until the next operation. The dwell 49ª permits the cam to make a complete revolution in certain instances when the manual means is operated twice in succession, without shifting the member 16 axially, as when the change is made by shifting the same shipper rod from one side of neutral to the other. This cam and pin are means for forcing the clutch 43 out of operative position.

The shifting element or finger 16 is restrained from axial selecting movement from one shipper rod to another, until the shipper rod engaged with said member 16 is returned to neutral position, and as here shown it is restrained by a pin 16ª on the member 16, working in slots 16ᵇ in a cover plate 12ª, Fig. 4ª, of the casing and a cross over slot 16ᶜ connecting the slots 16ᵇ. When a shift is made, the pin 16ª passes in one of the slots 16ᵇ from the slot 16ᶜ and when another speed is desired, the member 16 cannot be shifted axially until the member has been rocked to carry the pin 16ª into the cross over slot.

The pins 50 and 51 are operated by a disk 52, Fig. 2, loosely mounted on the shaft 23 and having cams 53, 54 on diametrically opposite sides thereof, these cams coacting with the heads of the pins 50 and 51 and being so shaped as to effect the alternate movements thereof, to be described.

The disk clutch operating means is also operated from the cam 24 through the medium of the cam lever 55, Figs. 2, 5, 6 and 15, mounted on the shaft 36 and connected thereto to rock the same, the lever 55 having a wiper 56 coacting with the cam groove 57 in the cam disk 24. The rock shaft 36 is connected to the shaft 5 on which the foot pedal is mounted by means of the link 58, Fig. 1, pivoted at its front end at 59 to a rock arm 60 fixed on the shaft 5 and connected at its rear end to the rock arm 36ᶜ by a pin-and-slot connection 61 which permits the yoke to be operated by the foot pedal 10.

The shaft 36 is journaled in brackets 120 supported by the casing 12 and is primarily to transmit the motion of the cam 57 and support the arm 55, but it also constitutes a convenient means for mounting the levers 25 and 35. The cam grooves 57 and 39 are so shaped that under normal conditions the lever 55 is actuated to release the disk clutch before the lever 25 is acted upon to operate the link 26 and to hold the disk clutch disengaged until the gear shifting operation is completed by the link 26.

But in order to delay the engaging of the main or disk clutch 3 under abnormal conditions, as when the gears abut or clash, means is provided whereby the rocking of the lever shaft 36, which is positively connected to the clutch operating means, is delayed by the lever 35, and a lost motion connection is provided between the lever 35 and the shaft 36, in order that the rocking motion of the lever 55 will not be transmitted to the rock shaft when the rock shaft is delayed. Said means comprises a pair of outwardly extending shoulders 36ª, 36ᵇ Fig. 13 provided on the rock shaft, the shoulder 35ᶜ, Figs. 13 and 14, on the lever 35, which shoulder is arranged in advance of the shoulder 36ª to restrain rocking of the shaft forwardly to permit the clutch to engage, and a shoulder 55ª, Figs. 13 and 15, on the lever 55, which shoulder 55ª is arranged in advance of the shoulder 36ᵇ, so that it can move away from the same, when the rock shaft 36 is restrained by the shoulder 35ᶜ. As soon as the gears come in intermeshing relation and the arm 35 is actuated by the spring 37, the rock shaft 36 is rocked ahead by the spring of the main clutch, and takes up the lost motion between the shoulder 36ᵇ and 55ª. In case there is no rotating motion between the gears of the gearing, so that when the gears clash they will remain in abutting relation and will not mesh, it is necessary to shift temporarily to another speed. For instance, if the gears clash when shifting in first or high speed and there is no rotation in the gearing, the driver would shift to second speed or to any other speed where the gears do not clash. The lever 55 constitutes a driving part positively connected to the cam 24, and the shaft 36, a driven part positively connected to the main clutch operating means.

The manually operated means for effecting the selecting movement of the shifting member 16 and for controlling the actuation or rocking movement of said member by the power shaft, preferably consists of a single lever, and connections between the lever and the shiftable connecting means and between said lever and the selecting and shifting member 16, the connections to the shiftable connecting or clutch means in this form of my invention, operate to shift the cam 52 and serve to shift the reversing member 26 to make connection with the rocking member 16 on the proper side of the axis thereof.

As here illustrated, a lever movable about two axes is employed, it being movable about one axis to shift the member 16 and about its other axis to operate the cam 52.

62, Figs. 17 and 18, is the lever which is preferably mounted upon the steering wheel post 63, said lever is pivoted to a support 64 journaled in an upright bearing 65 formed in a bracket 66 mounted on the steering wheel post 63, the support 64 being keyed at 67 to a rock shaft 68 extending lengthwise of the steering wheel post, the key 67 extending into a long key-way 69 which permits up and down movement of said shaft 68.

The lever 62 is provided with a handle 70 and is pivoted at 71 to the support 64 and movable about its axis 71 in a direction at a right angle to the axis of the shaft 68 and said lever is also provided with a toothed segment 72 which meshes with a rack 73 in the rod 68. A suitable sector 74 is supported by the bracket 66 and formed with an arc shaped slot 75 concentric with the axis of the shaft 68 and lateral slots 76, 77, 78, 79 and 79ª.

The rocking movement of the rod 68 effected by the lever 62, is transmitted to the member 16 to shift the same axially, and the lengthwise movement of the rod 68, effected by the movement of the lever about its axis 71, is transmitted to the cam disk 52 and to the motion reversing member 26.

The rocking movement of the rod 68 is transmitted to the member 16 by means of the rock arm 80, Figs. 19 and 20, located at the lower end of the rod 68 and connected thereto by a sliding connection which permits the rod to slide in the hub of the arm 80, and said arm 80 is connected to one end of a link 81, the other end of which is connected to one arm of the bell crank lever 82, Fig. 1, pivoted at 83 between its ends to a bearing on the casing 12 and having its other arm connected at 84 to a rod 85 slidable in a bearing in the casing 12 and connected by a fork 86 to the member 16.

The vertical movement of the rod 68 is transmitted to the cam 52 by means of a bell crank lever 87, Fig. 19, pivoted at 88 to the support 89 of the arm 80, one arm of the bell crank lever being connected at 90 to the lower end of the rod 68 and the other arm thereof being connected to one end of a link 91, the other end of which is pivoted to a rock arm 92, Figs. 1 and 20, mounted on one end of a rock shaft 93 extending through the hollow shaft 18 and on the opposite end of which rock shaft is mounted a rock arm 94 which is connected by a link 95 to the cam disk 52, Fig. 2, the link being pivoted to the cam at 96. The rock shaft 93 is provided with a cam 97, Figs. 2 and 12 thereon which works in a slot 98 in the reversing member 26 to raise or lower the same in accordance with the direction of rotation of the shaft 93.

The cap 12', Figs. 2, 4 and 4ª, holds the sleeve 18 and rod 85 in their bearings, this cap resting on the surface 99, Fig. 1. The cam 97, Fig. 12, is connected to the shaft 93 by a lost motion consisting of a pin 93ª on the shaft and a slot 97ª in the cam. This lost motion delays the shifting of the member 26 until after the shaft 93 has been rocked sufficiently to operate the pins 50 and 51 to let the clutch section 43 move into operative position, and the cam 24 and member 26 to begin to operate to shift the member 16 to neutral position. Should the shaft be rocked suddenly beyond its central position before the gear shifting operation is completed, shifting of the reversing member 26 is prevented by the pin 29 or 30, as the case may be, not being alined with its companion notch 27 or 28 and hence striking the end of the arm 31 or 32.

As will be understood by those skilled in the art, the member 16 is usually in a neutral position with respect to its rocking movement and upon movement of the lever 62 about its vertical axis, that is, the axis of the shaft 68, the shaft 68 is rocked by the lever 62 until the lever 62 is opposite one of the slots 76, 77, 78 and 79, or the reverse slot 79ª. This movement of the lever along the slot 75 causes the member 16 to be shifted axially, moving the pin 16ª through the cross over slot 16ᶜ into alinement with one of the slots 16ᵇ, to select the gear intended to be shifted. Upon movement of the lever about its axis 71 into one of the slots 76, 77, 78, 79, 79ª the rod 68 is moved upwardly or downwardly in accordance with the direction of movement of said lever, thus causing the shaft 93 to be rocked to operate the motion reversing member 26 and the cam 52. For instance, if the lever 63 is moved into the slot 76 or the slot 78, the rod 68 will be moved upwardly, and if said lever is moved into the slot 77 or 79, the rod 68 will be moved downwardly. This difference in motion of the rod 68 rocks the shaft 93 in opposite directions causing the cam 97 to raise or lower the member 26. For instance, if the lever is moved into the slot 76 or 78 so that the rod 68 is raised, the shaft 93 will be rocked to the left, Fig. 2 so that the reversing member will engage its slot 27 with the pin 29 of the arm 31, and if the lever 63 is operated laterally into the slot 77 or 79, the rod 68 is moved downwardly and the shaft 93 moved to the right, Fig. 1, causing the cam 97 to move the motion reversing member 26 downwardly to engage the notch 28 thereof with the pin 30 of the lower rock arm 32 connected to the shifting member to rock the same.

In order that the reverse movements of the shaft 93 may have no different effect upon the operation of the cam 24, the cams 53, 54 are double and the pins 50, 51 are normally engaged with the cams at the centers thereof. In Fig. 2, this cam and the rock shaft 93 and parts operated thereby are shown as having been operated to move the reversing member 26 into engagement with the upper arm 31 and to withdraw one pin out of the cam portion of the slot and move the other pin into the blank portion thereof, the position of the parts being just before any motion has been transmitted to the cam shaft.

As indicated in Fig. 16, the lever 62 occupies the slots 76, 77, 78, 79 and 79ª when the gearing is set to produce first, second, third and fourth forward speeds and reverse, respectively. Assuming that the lever 62 occupies the first speed slot 76, and it is desired to shift the gearing into second speed, the cam 24 has made a half revolution from its starting position as the shifting member 16 is in its position occupied when a gear element is shifted.

Movement of the lever 62 upwardly out of the slot 76 shifts the rod 68 downwardly moving the bell crank lever 87, Fig. 19, pushing the link 91 rearwardly, and rocking the arm 92 rearwardly from its forward position, rocking the shaft 93 to the right, Fig. 2 and operating the cam 52 to operate the pin 50 or 51 to release the clutch section 43. This rocking of the shaft 93 also rocks the cam 97, and owing to the lost motion between the shaft 93 and the cam 97, Fig. 12, the reversing member 26 does not change its engagement with the shifting member, but remains with its slot 27 engaged with the pin 29 of the upper rock arm 31 which is connected to the member 16 to rock said member, the cam 97 remaining in engagement with the member 26 during the movement of the lever 62 out of the slot 76 to the cross-over slot 75. Hence, the selecting member 26 remains engaged with the same arm 31 that it was engaged with when the lever 62 was in the slot 76.

The half revolution of the clutch section 43 and cam 24 rocks the member 16 to shift the gear to neutral position. Continued movement of the lever 62 into the slot 77, moves the shaft 68 farther downwardly, additionally rocking the shaft 93 shifting the cam 97 to shift the selecting member 26 to engage its notch 27 with the pin 30 of the lower rock arm 32, this movement again operating the cam 52. Owing to the dwell 49ª of the cam 46 of the clutch 43, no halt is necessary to permit the clutch to complete its first half revolution. It is, however, necessary that the lever 62 be actuated slow enough to give the gear shifting mechanism time to act, and an attempt to actuate the lever 62 too fast will be prevented by the fact that the pin 30 will engage the end of the arm 32 as previously explained.

During the shifting of the lever 62 from the slot 76 to 77 or from slot 78 to 79, or vice versa, no axial or selecting movement of the member 16 takes place and the pin 16ª passes from one slot 16ᵇ into an alined slot 16ᵇ on the opposite side of the cross-over 16ᶜ.

Assuming a shift is to be made from second to third speed, the lever 62 is moved downwardly about its axis 71, Fig. 17, out of the slot 77 moving the rod 68 upwardly; thereby pulling the link 91 forwardly rocking the shaft 93 to the left Fig. 2, actuating the cam disk 52 to release the clutch 43 which together with the cam 24 makes a half revolution from its half-way point to its starting position, thus setting the member 16 and the gear in neutral position. Movement of the lever 62 about the axis of the shaft 68 forwardly toward the slot 78 rocks the shaft 68 thereby rocking the arm 80 forwardly or to the right Figs. 18 and 19, pulling the link 81 forwardly to the right, Figs. 1 and 18 moving the bell crank lever 82, Fig. 1, and shifting the sliding rod and member 16 axially to the right of the gearing, or downwardly in Fig. 1. Rocking movement of the member 16 by the gear shifting mechanism moves the pin 16ª to the cross-over slot 16ᶜ and the axial shifting thereof by the hand lever moves the pin 16ª along the cross-over slot 16ᶜ into alinement with another slot 16ᵇ.

The lever 62 is shifted along the slot 75 until said lever is opposite the slot 78, thus effecting the selecting movement as described and said lever is then moved downwardly about its axis 71 into the slot 78 moving the rod 68 upwardly rocking the bell crank lever 87, Fig. 19, pulling the link 91 forwardly, rocking the shaft 93 to the left, Fig. 2, moving the cam 97 to the left, the reversing member 26 upwardly to engage the slot 27 thereof with the pin 29 of the rock arm 31, which rock arm rocks the shifting member 16. This movement of the rock shaft 93 is transmitted to the cam disk 52 to operate the clutch section 43 and permit the clutch section and cam 24 to make a half revolution from starting position to half-way position, thus shifting the gear. These slots 16ᵇ prevent movement of the lever from the slot 75 into the slot 78 until the pin 16ª has reached the cross-over slot 16ᶜ.

The cam 24 also acts to disengage and engage the disk clutch before and after each gear shifting operation, as previously described.

My automatic shifting means is particularly advantageous in that it is particularly simple in construction, is applied to a transmission gear casing, and can be readily applied to standard transmission gears and engines.

What I claim is:—

1. In a selective change speed transmission gearing, gear shifters, a member coacting with the shifters and having a selecting and shifting movement, power driven means for effecting the shifting movement, and manual means for effecting the selecting movement and controlling the shifting movement by the power driven means, substantially as and for the purpose described.

2. In a change speed transmission gearing, the combination of a member having a selective and shifting movement, a power shaft, normally idle power transmitting mechanism between the shaft and said member and including connecting means shiftable into and out of effective connection with said shaft and being normally out of effective connection therewith, and manual means for effecting the selecting movement of said member and controlling the shifting of the connecting means into effective position, substantially as and for the purpose set forth.

3. In a change speed transmission gearing, the combination of a rocking and axially movable selecting and shifting member, a power shaft, normally idle power transmitting mechanism between the shaft and said member to effect the shifting movement thereof, said mechanism including connecting means shiftable into and out of effective connection with the shaft and being normally out of effective connection therewith, and manual means for effecting the selecting movements of said shifting member and controlling the shifting movement of the connecting means into effective connection with the shaft to effect the shifting movement of said member, substantially as and for the purpose described.

4. In a change speed transmission gearing, a member having a selecting and shifting movement, a power driven shaft, normally idle power transmission mechanism between the shaft and said member including a clutch element shiftable into and out of connection with said shaft and being normally out of connection therewith, and manual means for effecting the selecting movement of said member, and controlling the movement of the clutch element into operative position to effect the actuation of the shifting mechanism, substantially as and for the purpose specified.

5. In a change speed gearing, a rocking and axially movable selecting and shifting member, a power shaft, normally idle power transmitting mechanism between the shaft and said member to effect the shifting movement thereof, said mechanism including a clutch element shiftable into and out of connection with the shaft and being normally out of connection therewith, and manual means for effecting the selecting movement of said member and controlling the movement of the clutch element into operative connection with the power shaft to control the shifting movement of said member, substantially as and for the purpose set forth.

6. In a change speed transmission gearing, a rocking axially movable selecting and shifting member, a power shaft, power transmitting mechanism between the shaft and said member to effect the rocking movement thereof, said mechanism including a clutch element shiftable into and out of connection with the shaft and being normally out of connection therewith, and manual means for effecting the axial movement of said member and controlling the movement of the clutch element into operative position, substantially as and for the purpose described.

7. In a change speed transmission gearing, a rocking axially movable selecting and shifting member, a power shaft, power transmitting mechanism between the shaft and said member to effect the rocking movement thereof, said mechanism including a clutch element shiftable into and out of connection with the shaft and being normally out of connection therewith, and manual means for effecting the axial movement of said member and controlling the movement of the clutch element into operative position including a rock shaft, and said shifting member comprising a sleeve arranged concentric with and slidable axially of, and movable about said rock shaft, substantially as and for the purpose specified.

8. A gear shifting means comprising a shifting member, a power driven shaft, power transmitting mechanism between the shifting member and the shaft comprising clutch means shiftable into and out of effective connection with the shaft and being normally out of effective connection therewith, and means for shifting the clutch means into effective connection with the shaft, substantially as and for the purpose specified.

9. A gear shifting means comprising a shifting member, a power driven shaft, power transmitting mechanism between the shifting member and the shaft comprising a member movable in opposite directions, clutch means shiftable into and out of effective connection with the shaft and being normally out of effective connection therewith, means for reversing the movement transmitted to the shiftable member by the clutch means, and means for shifting the clutch means into effective connection with the shaft, substantially as and for the purpose set forth.

10. In a change speed transmission gearing, a shifting member movable in opposite directions, a power shaft, normally idle power transmitting mechanism between the shaft and said member for effecting the shifting thereof, said mechanism including motion reversing means shiftable to transmit motion in opposite directions to said member, and manual means for effecting the shifting of the reversing means and controlling the actuation of said mechanism by the shaft, substantially as and for the purpose set forth.

11. In a change speed transmission gearing, a rocking shifting member movable in opposite directions, a power shaft, and normally idle transmitting mechanism between the shaft and said member to rock the same, said mechanism including a motion reversing member shiftable into connection with the rocking member on either side of the axis thereof, substantially as and for the purpose described.

12. In a change speed transmission gearing, a rocking shifting member movable in opposite directions, a power shaft, normally idle transmitting mechanism between the shaft and said member to rock the same, said mechanism including a motion reversing member shiftable into connection with the rocking member on opposite sides of the axis thereof, and manual means for controlling the shifting of said reversing member and the actuation of said mechanism by the power shaft, substantially as and for the purpose specified.

13. In a change speed transmission gearing, a rocking shifting member movable in opposite directions, a power shaft, normally idle power transmitting mechanism between the shaft and said member to rock the same, said mechanism including a motion reversing member shiftable into and out of connection with the rocking member on opposite sides of the axis thereof, and means for connecting and disconnecting said mechanism and the power shaft, and manual means for effecting the shifting of the reversing member and the operation of the former means, substantially as and for the purpose set forth.

14. In a change speed transmission gearing, a rocking shifting member movable in opposite directions, a power shaft, normally idle power transmitting mechanism between the shaft and said member to rock the same, said mechanism including a motion reversing member shiftable into and out of connection with the rocking member on opposite sides of the axis thereof, and means for connecting and disconnecting said mechanism and the power shaft, and manual means for effecting the shifting of the reversing member and the operation of the former means including a rocking part having a cam coacting with said reversing member to shift the same, substantially as and for the purpose described.

15. In a change speed transmission gearing, a rocking member movable about its axis in opposite directions from its neutral position to effect different gear shifts, a power shaft, normally idle power transmitting mechanism between the shaft and said member including a motion reversing member shiftable into and out of engagement with the former member on opposite sides of the axis, and connecting means shiftable into and out of effective connection with said shaft, and manual means including a rocking part coacting with the motion reversing member to shift the same and connections operating to shift the shiftable connecting means, substantially as and for the purpose set forth.

16. In a change speed gearing, the combination of a rocking member, a power shaft, normally idle power transmitting mechanism between the shaft and said member including shiftable connecting means shiftable into and out of effective connection with the shaft, and manual means for controlling the shifting of the rocking member and the movement of the connecting means into and out of effective connection with the power shaft, substantially as and for the purpose described.

17. In a change speed gearing, the combination of a rocking member, a power shaft, normally idle power transmitting mechanism between the shaft and said member including a shiftable connecting means shiftable into and out of connection with the shaft, and manual means for controlling the rocking of the member and controlling the shifting of the connecting means into and out of effective connection with the power shaft, said manual means including a rock shaft having a cam thereon coacting with the reversing member, substantially as and for the purpose specified.

18. In a change speed transmission gearing, a rocking shifting member movable about its axis in opposite directions from its neutral position to effect different gear shifts, a power shaft, normally idle power transmitting mechanism between the shaft and said member including rock arms projecting in opposite directions relatively to the axis of the shifting member and a motion reversing member shiftable into and out of engagement with either of the rock arms, said mechanism also including a clutch means shiftable into and out of connection with said shaft, and manual means including a rocking part having a cam coacting with the motion reversing member to shift the same, and said part being also connected to the clutch thereof into an operative position, substantially as and for the purpose specified.

19. In a change speed gearing, a rocking shifting member, a power shaft, normally idle power transmitting mechanism between the shaft and said member including a shiftable connecting means normally out of effective connection with the shaft and shiftable into and out of connection with the shaft, and a motion reversing member shiftable into and out of connection with the rocking member, and manual means for effecting the shifting of the reversing member and controlling the movement of the shiftable connecting means into operative position comprising a rock shaft for operating the clutch element, and an operating lever connected to the shifting member to move the same axially on the rock shaft, substantially as and for the purpose set forth.

20. In a change speed gearing, a rocking shifting member, a power shaft, normally idle power transmitting mechanism between the shaft and said member including a shiftable connecting means normally out of effective connection with the power shaft and shiftable into and out of connection with the shaft, and a motion reversing member shiftable into and out of connection with the rocking member, manual means for effecting the shifting of the reversing member and controlling the movement of the shiftable connecting means into effective connection comprising a rock shaft having a cam thereon coacting with the reversing member, substantially as and for the purpose specified.

21. In a change speed gearing, a rocking shifting member, a power shaft, normally idle power transmitting mechanism between the shaft and said member including a clutch element shiftable into and out of connection with the shaft, and a reversing member shiftable into and out of connection with the rocking member, and manual means for effecting the shifting of the reversing member and controlling the movement of the clutch element into operative position, the manual means comprising a rock shaft, and the shifting member comprising a sleeve mounted concentric with the rock shaft and movable about the same, substantially as and for the purpose specified.

22. In a change speed gearing, a rocking shifting member, a power shaft, normally idle power transmitting mechanism between the shaft and said member including a clutch element shiftable into and out of connection with the shaft, and a reversing member shiftable into and out of connection with the rocking member on opposite sides of its axis, manual means for effecting the shifting of the reversing member and controlling the movement of the clutch element into operative position, the manual means comprising a rock shaft, and the rocking member comprising a sleeve mounted concentric with the rock shaft and movable about the same, the rock shaft having a cam coacting with the reversing member, substantially as and for the purpose set forth.

23. In a change speed transmission gearing, a member having a selecting and shifting movement and being normally arranged in a neutral position with respect to its shifting movement and being movable in opposite directions from its neutral position to effect different gear shifts, a power shaft, normally idle power transmitting mechanism between the shaft and said member for effecting the shifting movement thereof, said mechanism including motion reversing means shiftable to transmit motion in opposite directions, and manual means for effecting the selective movement of said member and effecting the shifting of the reversing means and controlling the actuation of said mechanism by the shaft, substantially as and for the purpose described.

24. In a change speed transmission gearing, a rocking axially movable selecting and shifting member normally arranged in neutral position with respect to its rocking movement and movable in opposite directions from its neutral position to effect different shifts, a power shaft, and normally idle power transmitting mechanism between the shaft and said member to rock the same, said mechanism including a motion reversing member shiftable into and out of connection with the rocking member on opposite sides of the axis thereof, substantially as and for the purpose specified.

25. In a change speed transmission gearing, a rocking axially movable selecting and shifting member, a power shaft, normally idle power transmitting mechanism between the shaft and said member to rock the same, said mechanism including a motion reversing member shiftable into connection with the rocking member on opposite sides of the axis thereof, manual means for effecting the axial movement of said member and controlling the shifting of said motion reversing member and the actuation of said mechanism by the power shaft, substantially as and for the purpose set forth.

26. In a change speed transmission gearing, a rocking axially movable selecting and shifting member, a power shaft, normally idle power transmitting mechanism between the shaft and said member to rock the same, said mechanism including a motion reversing member shiftable into connection with the rocking member, and means for connecting and disconnecting the power transmitting mechanism and the power shaft, and manual means for effecting the axial movement of the selecting and shifting member, the shifting of the reversing member and the operation of said means to connect the power shaft and the power transmitting mechanism, substantially as and for the purpose described.

27. In a change speed transmission gearing, a rocking axially movable selecting and shifting member, a power shaft, normally idle power transmission mechanism between the shaft and said member including a motion reversing member shiftable into and out of engagement with said member on opposite sides of its axis, said mechanism also including connecting means shiftable into and out of connection with the power shaft, manual means including a rocking part coacting with the motion reversing member to shift the same, and connections coacting with the said connecting means for controlling the movement thereof into and out of effective connection with the said power shaft, substantially as and for the purpose set forth.

28. In a change speed transmission gearing, a rocking axially movable selecting and shifting member, a power shaft, normally idle power transmitting mechanism between the shaft and said member including oppositely extending rock arms connected to said member, and a motion reversing member shiftable into and out of engagement with either of the arms, said mechanism also including a clutch element shiftable into and out of connection with said shaft, manual means for effecting the axial shifting of said member including a rocking part having a cam coacting with the motion reversing member to shift the same, said manual means also controlling the movement of the clutch element into operative position, substantially as and for the purpose specified.

29. In a change speed gearing, a rocking axially movable selecting and shifting member, a power shaft, normally idle power transmitting mechanism between the shaft and said member for effecting the rocking movement thereof, said mechanism including a clutch element shiftable into and out of connection with said shaft and a motion reversing member shiftable into and out of connection with the rocking member, manual means for effecting the selecting movement of the shifting member and effecting the shifting of the reversing member and controlling the movement of the clutch element into operative position, the manual means comprising a rock shaft, and the rocking member comprising a sleeve mounted concentric with the rock shaft and slidable axially thereof, substantially as and for the purpose set forth.

30. In a change speed transmission gearing, a shifting member normally arranged in neutral position and movable in opposite directions from its neutral position to effect different gear shifts, a power shaft, normally idle power transmitting mechanism between the shaft and said member for effecting the shifting thereof, said mechanism including motion reversing means shiftable to transmit motion in opposite directions to said member, and manual means for effecting the shifting of the reversing means and controlling the actuation of said mechanism by the shaft, the manual means including a part operable to delay the shifting of the reversing means until the actuation of said mechanism to shift the gears into neutral position, substantially as and for the purpose described.

31. In a change speed transmission gearing, a rocking member, a power shaft, normally idle power transmitting mechanism between the shaft and said member to rock the same including a motion reversing member shiftable into and out of connection with the rocking member on opposite sides of its axis, and means for effectively connecting and disconnecting said mechanism and the power shaft, and manual means for controlling the shifting of the reversing member and the operation of the former means including a rocking part, and a cam coacting with the rocking part to receive motion therefrom and with the reversing member to shift the same, the cam being connected to one of the parts with which it coacts by a lost motion connection, substantially as and for the purpose described.

32. In a change speed transmission gearing, a rocking member, a power shaft, normally idle power transmitting mechanism between the shaft and said member to rock the same including a motion reversing member shiftable into and out of connection with the rocking member on opposite sides of its axis, and means connecting and disconnecting said mechanism and the power shaft, and manual means for effecting the shifting of the reversing member and the operation of the former means, the manual means including a rocking part having a cam coacting with the reversing member to shift the same, the cam being connected to the rocking part by a lost motion connection, substantially as and for the purpose specified.

33. In a change speed transmission gearing, a rocking shifting member, a power shaft, normally idle power transmitting mechanism between the shaft and said member including rock arms projecting in opposite directions relatively to the axis of the shifting member and being connected to said member to rock the same, a motion reversing member shiftable into and out of engagement with either of the rock arms, said mechanism also including a clutch shiftable into and out of engagement with said shaft, and manual means including a rocking part having a cam coacting with the reversing member to shift the same, and connected to the clutch to control the movement thereof into operative position, the cam being connected to the rocking part by a lost motion connection, substantially as and for the purpose set forth.

34. In a change speed transmission gearing, a rocking shifting member, a power shaft, normally idle power transmitting mechanism between the shaft and said member including rock arms projecting in opposite directions and connected to said member to rock the same, a motion reversing member shiftable into and out of engagement with either of the rock arms, the rock arms being formed with pins and the reversing member formed with open-ended slots for receiving the pins respectively, said mechanism also including a clutch shiftable into and out of connection with said shaft, and manual means including a rocking part having a cam coacting with the motion reversing member and connected to the clutch element, the cam being connected to the rocking part by a lost motion connection, substantially as and for the purpose described.

35. In a change speed transmission gearing, a rocking shifting member, a power shaft, normally idle power transmitting mechanism between the shaft and said member including a clutch element shiftable into and out of connection with the shaft and the reversing member shiftable into and out of connection with the rocking member on opposite sides of its axis, manual means for effecting the shifting of the reversing member and controlling the movement of the clutch into operative position, the manual means comprising a rock shaft and the rocking member comprising a sleeve mounted concentric with the rock shaft and movable about the same, the rock shaft having a cam coacting with the reversing member and the cam being connected to the rock shaft by a lost motion connection, substantially as and for the purpose specified.

36. In a change speed gearing, a rocking shifting member, a power shaft, normally idle power transmitting mechanism between the shaft and including a clutch element shiftable into and out of connection with the shaft, and a reversing member shiftable into and out of connection with the rocking member on opposite sides of its axis, manual means for effecting the shifting of the reversing member and controlling the movement of the clutch element into operative position comprising a rock shaft having a cam thereon coacting with the reversing member, the cam being connected thereto by a lost motion connection, substantially as and for the purpose set forth.

37. In a change speed gearing, a rocking, axially movable selecting and shifting member, a power shaft, normally idle power transmitting mechanism between the shaft and said member for effecting the rocking movement thereof, said mechanism including a clutch shiftable into and out of connection with said shaft, and a motion reversing member shiftable into and out of connection with the rocking member, manual means for effecting the selecting movement of the shifting member and effecting the shifting of the reversing member and controlling the movement of said clutch into operative position, the manual means comprising a rock shaft and the rocking member comprising a sleeve mounted concentric with the rock shaft and slidable axially thereof, the rock shaft having a cam coacting with the reversing member to shift the same and being connected to the clutch element to control the shifting of the same, substantially as and for the purpose described.

38. The combination with a driving shaft, a driven shaft, a main clutch connecting the driving and driven shafts, and means for operating the clutch, of a transmission gearing including shifters, a member coacting with the shifters to shift the same, power transmitting mechanism between the driving shaft and said member for effecting the shifting movement thereof including connecting means shiftable into effective connection with the driving shaft after the main clutch is disengaged and out of effective connection prior to reëngaging the main clutch, substantially as and for the purpose specified.

39. The combination with a driving shaft and driven shaft, a main clutch connecting the driving and driven shafts, and means for operating the clutch, of a transmission gear-transmission gearing including a shifting member, power transmitting mechanism between the driven shaft and said member including connecting means normally out of effective connection with the driving shaft, connections between said mechanism and the main clutch operating to shift the main clutch out of operative position, and permit the same to move into operative position before and after the gear shifting operation, and manual means for controlling the operation of said connecting means into and out of effective position, substantially as and for the purpose described.

40. The combination with a driving shaft, a driven shaft, a main clutch connecting the driving shaft and the driven shaft, and means for operating the clutch, of a change speed transmission gearing including a shifting member, power transmitting mechanism between the driving shaft and said member including an actuator, connections between the actuator and the main clutch operating means, and connecting means operable to effectively connect said actuator and the power shaft, and manual means for controlling the operation of the connecting means, substantially as and for the purpose specified.

41. In a change speed gearing, a rocking axially movable selecting and shifting member normally arranged in a neutral position with respect to its shifting movement and movable in opposite directions from its neutral position to effect different gear shifts, a power driven shaft, normally idle power transmitting mechanism between the shaft and said member for effecting the rocking movement thereof, said mechanism including a shiftable clutch element and a motion reversing member shiftable into and out of connection with the rocking member, manual means for effecting the selecting movement of the first member and effecting the shifting of the reversing member and controlling the movement of the clutch element into operative position, the manual means comprising a rock shaft, and a non-slidable sleeve having arms extending in opposite directions therefrom and coacting with the reversing member, the rocking member including a sleeve mounted concentric with and slidable on the rock shaft and connected to the non-slidable sleeve to rock therewith, means on the rock shaft, coacting with the reversing member to shift the same, and means connecting the rock shaft and the shiftable element to control the shifting thereof, substantially as and for the purpose specified.

42. The combination with a driving shaft, a driven shaft, and a clutch connecting the driving and driven shafts, and means for operating the clutch; of a transmission gearing connected to the driven shaft including shifters, a member coacting with the shifters to shift the same, power transmitting mechanism between the shaft and said member for effecting the shifting movement thereof including a clutch, and means whereby the second-mentioned clutch is moved into operative position after the main clutch is disengaged, and the main clutch reëngaged after the second clutch is disengaged, substantially as and for the purpose specified.

43. The combination with a driving shaft, a driven shaft, a main clutch connecting the driving and driven shafts, and means for operating the clutch; of a change speed transmission gearing including a shifting member, power transmitting mechanism between the driving shaft and said member including a clutch section normally out of operative position, connections between said mechanism and the main clutch operating means, and manual means for controlling the operation of the second-mentioned clutch, substantially as and for the purpose set forth.

44. The combination with a driving shaft, a driven shaft, a main clutch connecting the driving shaft and the driven shaft, and means for operating the clutch; of a change speed transmission gearing including a shifting member, power transmitting mechanism between the shaft and said member including a shaft, a cam mounted on the shaft, connections between the cam and the main clutch operating means, a clutch operable to connect said shaft to the power shaft, the clutch being mounted on the cam shaft, and manual means controlling the operation of the second-mentioned clutch, substantially as and for the purpose described.

45. The combination of a driving shaft, a driven shaft, a main clutch between the shafts, and means for operating the main clutch; of a change speed gearing including a shifting member, power transmitting mechanism between the shaft and said member and the clutch operating means including a shaft, a cam mounted on the shaft, a rock shaft connected to the clutch operating means, a lever fixed on the rock shaft and coacting with the cam, a lever loosely mounted on the rock shaft and coacting with the cam and being connected to the shifting member, a clutch for connecting and disconnecting the cam shaft and the power shaft, manual means for controlling the shifting of the last-mentioned clutch into operative position, and cam means for controlling the shifting of the cam out of operative position, substantially as and for the purpose specified.

46. The combination with a driving shaft, a driven shaft, a main clutch connecting the driving and driven shafts, and means for operating the main clutch; of a change speed transmission gearing connected to the driven shaft and including a shifting member, power transmitting mechanism between the driving shaft and said member including a clutch section normally out of operative position, connections between said mechanism and the main clutch operating means to control the operation of the same, manual means for controlling the operation of the second-mentioned clutch, and means controlled by the gear shifting mechanism for delaying the operation of said connection to prevent the main clutch from engaging until the gear shifting operation is completed, substantially as and for the purpose set forth.

47. The combination with a driving shaft, a driven shaft, a spring pressed main clutch connecting the driving and driven shafts, and means for operating the main clutch; of a change speed transmission gearing connected to the driven shaft and including a shifting member, a driving element, connections between the driving element and the shifting member, connections between the driving element and the main clutch operating means, a clutch operating to connect the driving element and the power shaft, and manual means for controlling the operation of the second-mentioned clutch, the gear shifting connections including a part positively connected to the driving element, a driven part positively connected to the shifting member, and a spring interposed between said parts, and the connections between the driving element and the main clutch operating means including a part positively connected to the driving element and a driven part positively connected to the main clutch operating means, the last two parts being connected by a lost motion connection normally taken up by the action of the spring of the main clutch on the second-named driven part, the driven part of the gear shifting connections having a shoulder arranged to restrain movement of the second-named driven part which is connected to the main clutch operating means, substantially as and for the purpose described.

48. The combination of a driving shaft, a driven shaft, a spring pressed main clutch between the shafts, and means for operating the clutch; of a change speed gearing connected to the driven shaft and including a shifting member, power transmitting mechanism between the shaft and said member and the clutch operating means including a shaft, a cam mounted on the shaft, a rock shaft connected to the clutch operating means and having a pair of peripheral shoulders, a lever loosely mounted on the rock shaft and connecting with the cam, a second lever loosely mounted on the rock shaft and connected to the shifting member, a spring interposed between the levers, the second lever having a shoulder arranged in the path of movement of one of the shoulders of the rock shaft to restrain movement of the rock shaft by the main clutch spring, a third lever loosely mounted on the rock shaft and coacting with the cam to be driven thereby, the third lever having a shoulder arranged in the path of movement of the other shoulder of the rock shaft to transmit movement to the rock shaft to disengage the main clutch, the shoulder of the third lever being movable away from the coacting shoulder of the rock shaft when the rock shaft is restrained by the shoulder of the second lever, a clutch for connecting and disconnecting the cam shaft from the power shaft, and manual means for controlling the shifting of the last-mentioned clutch into operative position, substantially as and for the purpose specified.

49. The combination of a driving shaft, a driven shaft, a clutch connecting the driving and the driven shafts, and means for operating the clutch; of a change speed transmission gearing including shifters, a member coacting with the shifters and having a selecting and shifting movement, normally idle power transmitting mechanism between the shaft and said member and the clutch operating means for effecting the shifting movement thereof, manual means for effecting the selecting movement of said member, and controlling the operation of said mechanism by the shaft, and power transmitting means between said mechanism and the clutch operating means to disengage and engage the clutch before and after each gear shifting operation, substantially as and for purpose set forth.

50. In a change speed transmission gearing, a shifting member, a power shaft, and power transmitting connections between the shaft and said member including shiftable connecting means normally out of effective connection with the power shaft, manual means for controlling the shifting of the connecting means into effective connection with the power shaft, and means operated by said mechanism for shifting the connecting means out of effective connection, substantially as and for the purpose set forth.

51. In a change speed transmission gearing, a shifting member, a power shaft, and power transmitting mechanism between the shaft and said member including a clutch section normally out of operative connection with the power shaft, manual means for controlling the shifting of the clutch section into operative position, and means operated by said mechanism for shifting the clutch section out of operative position, substantially as and for the purpose described.

52. In a change speed transmission gearing, a shifting member, a power shaft, and power transmitting connections between the shaft and said member including a clutch section normally out of operative position, a spring normally tending to force the clutch section into operative position, a lock normally restraining the operation of the clutch section by the spring, manually operated means for moving the lock out of its normal position, and means coacting with the clutch section to move the same out of operative position against the action of its spring during the rotation thereof, substantially as and for the purpose specified.

53. In a change speed transmission gearing, a shifting member, a power shaft, power transmitting mechanism between the shaft and said member including a rotatable spring pressed clutch section normally out of operative position, the clutch section being formed with a peripheral cam-way around the same and having a cam portion and a blank portion spaced apart, and a dwell between the cam and blank, oppositely disposed pins, one being normally arranged in the cam portion to hold the clutch section from movement by its spring, and the other being normally arranged opposite the blank portion and out of engagement with the same, manual means for moving one pin out of engagement with the cam portion whereby the clutch is permitted to move into operative engagement with the drive shaft and be rotated until the other pin passes through the dwell and enters the cam portion of the cam-way and withdraws the clutch out of operative position, substantially as and for the purpose set forth.

54. In a change speed gearing, a shifting member, a power shaft, power transmitting mechanism between the shaft and said member including a rotatable spring pressed clutch section normally out of operative position, the clutch section being formed with a peripheral cam groove around the same having a cam portion and a blank portion spaced diametrically opposite each other, a dwell portion between the cam and the blank portions, and a second dwell portion alined with the first and extending from the blank and terminating near the cam portion so that the groove extends nearly around the cltuch section, oppositely disposed pins, one being normally arranged in the cam portion to hold the clutch section from movement by its spring and the other arranged opposite the blank portion and out of the same, and manual means for moving one pin out of the cam groove and the other into the blank portion thereof, substantially as and for the purpose described.

55. In a change speed gearing, a rocking axially movable selecting and shifting member, a power shaft, power transmitting mechanism between the shaft and said member to effect the shifting movement thereof, said mechanism including shiftable connecting means shiftable into and out of effective connection with the shaft, and manual means for effecting the selecting movement of said member and controlling the shifting of said connecting means, including a hand lever movable about two axes arranged at an angle to each other and connections between the hand lever and the selecting and shifting member, to move the same axially during the movement of the hand lever about one axis and connections between said lever and the connecting means for shifting said connecting means during the movement of the lever about its other axis, substantially as and for the purpose set forth.

56. In a change speed gearing, a rocking axially movable selecting and shifting member, a power shaft, power transmitting mechanism between the shaft and said member to effect the rocking movement thereof, said mechanism including an element shiftable into and out of connection with the shaft and normally out of connection therewith, and manual means for effecting the axial movement of said member and controlling the movement of said element into operative position including a hand lever movable about axes arranged at an angle to each other, connections between said lever and the selecting and shifting member to move the same axially during one of the movements of said lever, and connections between said lever and said element whereby said element is operated during the movement of the lever about its other axis, substantially as and for the purpose specified.

57. In a change speed transmission gearing, a rocking axially movable selecting and shifting member, a power shaft, power transmitting mechanism between the shaft and said member to effect the rocking movement thereof, said mechanism including an element shiftable into and out of connection with the shaft, and being normally out of connection therewith, and manual means for effecting the axial movement of said member and controlling the movement of said element into operative position, said means including a rock shaft, said manual means also comprising a lever movable about two axes arranged at an angle to each other, connections between the lever and the shifting member whereby the member is shifted axially during movement of the lever about one of its axes, and connections between the lever and the rock shaft whereby the rock shaft is actuated during the movement of the lever about its other axis, substantially as and for the purpose set forth.

58. In a change speed transmission gearing, a shifting member, a power shaft, power transmitting mechanism between the power shaft and the shifting member including driving and driven parts, a spring interposed between said parts, an element shiftable into and out of connection with the power shaft, and manual means for controlling the shifting of said element, substantially as and for the purpose set forth.

59. In a change speed transmission gearing, a shifting member, a power shaft, power transmitting mechanism between the shaft and said member comprising a cam, a lever coacting with the cam, a second lever mounted concentric with the first lever, a link connecting the first lever and the shifting member, a spring interposed between the levers, and means operable to connect and disconnect the shaft and said mechanism, substantially as and for the purpose described.

60. In a change speed transmission gearing, a shifting member, a power shaft, power transmitting mechanism between the shaft and said member comprising a cam, a lever coacting with the cam, a second lever mounted concentric with the first lever, a link connecting the first lever and the shifting member, a spring interposed between the levers, a clutch element shiftable into and out of connection with the shaft for connecting and disconnecting the cam and the shaft, and manual means for controlling the shifting of said element into operative position, substantially as and for the purpose specified.

61. The combination with a driving shaft, a driven shaft, and a main clutch connecting the driving and driven shafts; of a change speed transmission gearing connected to the driven shaft including a shifting member, power transmitting mechanism between the driving shaft and said member including a shaft, cam means mounted on the shaft, means coacting with the cam means and connected to said member to shift the same, additional means coacting with the cam means and connected to the main clutch operating means, and a manually operated clutch section for connecting and disconnecting the cam shaft and the driving shaft, substantially as and for the purpose set forth.

62. The combination with a driving shaft, a driven shaft and a main shaft connecting the main clutch and the driving and driven shafts; of a change speed transmission gearing connected to the driving shaft including a shifting member, power transmitting mechanism between the driving and driven shafts and said member and the clutch operating means, means coacting with the cam and connected to said member to shift the same, additional means coacting with the cam and connected to the main clutch operating means, manual means for shifting the clutch section into operative position, and means whereby the clutch section is shifted out of operative position after making a half revolution, substantially as and for the purpose described.

63. In a change speed transmission gearing, a shifting member, a power shaft, power transmitting mechanism between the shaft and the shifting member including a shaft having a cam thereon, a shiftable clutch section for connecting and disconnecting the cam shaft and the power shaft, gear shifting mechanism operated by the cam and connected to the shifting member, manual means for shifting the clutch section into operative position, and means for shifting the clutch section out of operative position after the cam shaft has made a part of a revolution, substantially as and for the purpose specified.

In testimony whereof, I have hereunto signed my name in the presence of two attesting witnesses, at Syracuse, in the county of Onondaga, in the State of New York, this 8th day of May 1914.

CHARLES G. HANNA.

Witnesses:
ALEXANDER MELDRUM,
CHAS. H. YOUNG.